(12) United States Patent
Cui et al.

(10) Patent No.: US 12,388,728 B2
(45) Date of Patent: *Aug. 12, 2025

(54) FLEXIBLE SERVICE BASED ARCHITECTURE FOR ADVANCED COMMUNICATION NETWORKS

(71) Applicant: AT&T Intellectual Property I, L.P., Atlanta, GA (US)

(72) Inventors: Zhi Cui, Sugar Hill, GA (US); Hongyan Lei, Plano, TX (US); Paul Smith, Jr., Heath, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,156

(22) Filed: Jan. 16, 2024

(65) Prior Publication Data

US 2024/0187318 A1 Jun. 6, 2024

Related U.S. Application Data

(63) Continuation of application No. 17/661,961, filed on May 4, 2022, now Pat. No. 11,916,762.

(51) Int. Cl.
*H04L 41/5051* (2022.01)
*H04L 1/1812* (2023.01)
*H04L 67/60* (2022.01)

(52) U.S. Cl.
CPC ........ *H04L 41/5051* (2013.01); *H04L 1/1812* (2013.01); *H04L 67/60* (2022.05)

(58) Field of Classification Search
None
See application file for complete search history.

(56) References Cited

U.S. PATENT DOCUMENTS

| | | | |
|---|---|---|---|
| 10,560,370 B1 | 2/2020 | A et al. | |
| 12,058,646 B2 * | 8/2024 | Park | H04L 5/0053 |
| 2010/0322177 A1 * | 12/2010 | Luo | H04L 1/189 370/329 |
| 2018/0227792 A1 * | 8/2018 | Melander | H04W 24/10 |

(Continued)

*Primary Examiner* — Mohamed Ibrahim
(74) *Attorney, Agent, or Firm* — Guntin & Gust, PLC; Mark Wilinski

(57) ABSTRACT

A flexible service-based architecture (SBA) for next generation communication networks is described. In an embodiment, a method performed by a system comprising a processor comprises receiving a service request for provision of a data communication service to a communication device via a communication network comprising a plurality of different network resources defined by resource components and sub-components of the resource components. In response to receiving the service request, accessing network resource abstraction information that identifies the resource components, and the sub-components respectively associated with the resource components, and selecting a subset of the different network resources for the provision of the data communication service to the communication device based a service criterion associated with the data communication service. The method further comprises facilitating, by the system, the provision of the data communication service to the communication device via the communication network using the subset of the different network resources.

20 Claims, 7 Drawing Sheets

(56) References Cited

U.S. PATENT DOCUMENTS

| | | |
|---|---|---|
| 2018/0332442 A1 | 11/2018 | Shaw et al. |
| 2019/0021037 A1 | 1/2019 | Shaw et al. |
| 2019/0132218 A1 | 5/2019 | Senarath et al. |
| 2020/0404539 A1 | 12/2020 | Poe et al. |
| 2021/0120451 A1* | 4/2021 | Trim .................. H04W 28/0231 |
| 2023/0362069 A1 | 11/2023 | Cui et al. |
| 2024/0267792 A1* | 8/2024 | Zhu ................... H04W 28/0975 |

* cited by examiner

FLEXIBLE SERVICE BASED ARCHITECTURE FOR ADVANCED COMMUNICATION NETWORKS

CROSS-REFERENCE TO RELATED APPLICATION(S)

The present application is a continuation of U.S. patent application Ser. No. 17/661,961, filed May 4, 2022. All sections of the aforementioned application are incorporated herein by reference in their entirety.

TECHNICAL FIELD

This disclosure relates generally to communication networks and, more particularly, to a flexible service-based architecture (SBA) for advanced communication networks, such as, but not limited to, fifth generation (5G) communication networks and beyond.

BACKGROUND

The evolution of the wireless communication networks is creating new opportunities in new market sectors while driving demand for both service and new telecommunication applications. 5G wireless technologies enable massive data exchange with extremely low latencies and satisfy a variety of revolutionary consumer and enterprise use cases. 5G provides capabilities of low latencies, high bandwidth and large scale that enables new applications in areas such as manufacturing automation, autonomous transportation, virtual reality (VR), augmented reality (AR), extended reality (XR), Internet of Things (IOT) devices and others.

This drastic transformation of networks forces the legacy network management paradigms to also evolve. The "one slice fits all" service era and the associated business model is falling short as most industries need tailored network capabilities and business models. However, next generation networks present new challenges for tailored service delivery that require new concepts and technologies to address them.

The above-described description is merely intended to provide a contextual overview regarding wireless communication system mobility management and is not intended to be exhaustive.

DETAILED DESCRIPTION

Figure 1:
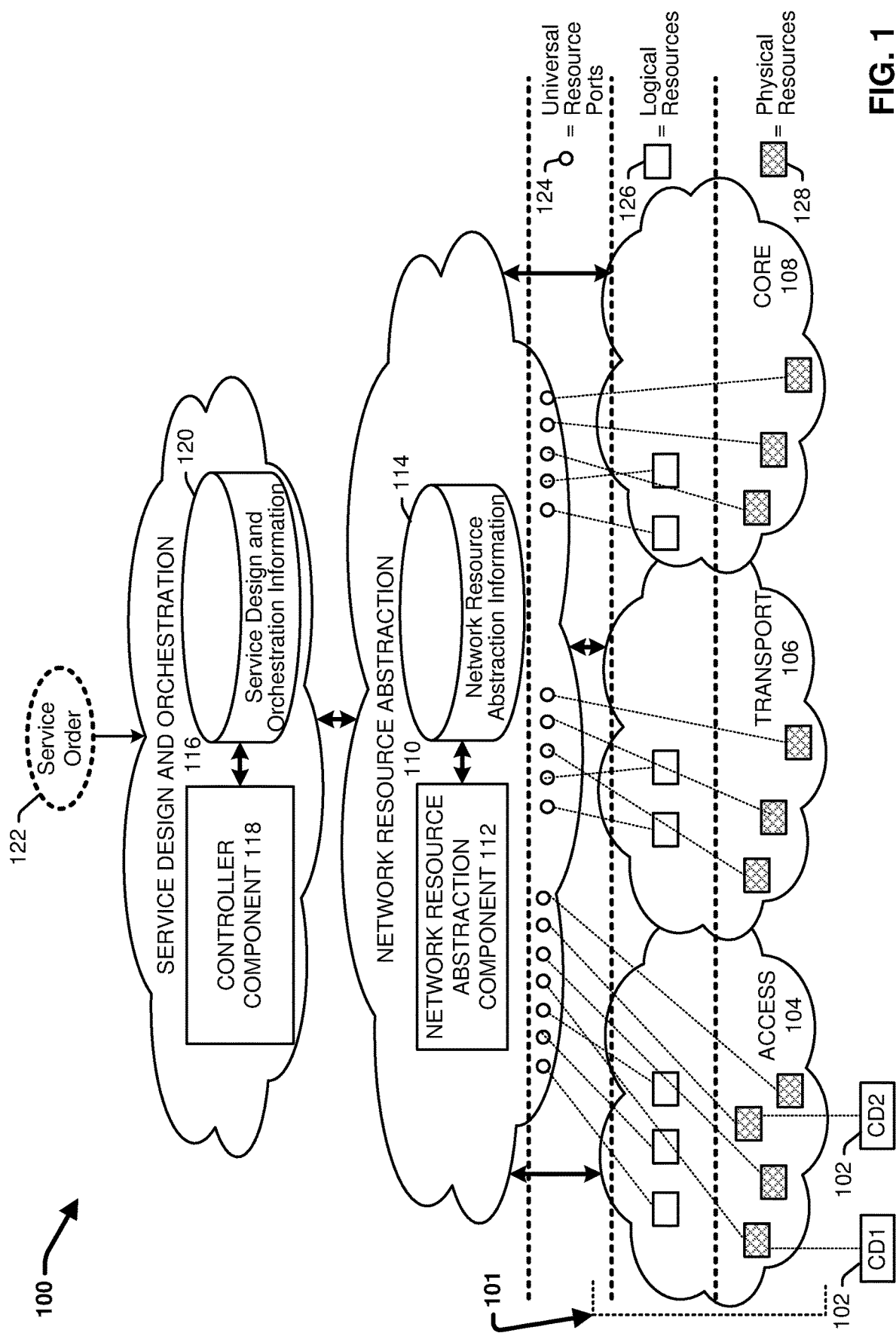
FIG. 1 illustrates an example communication system that employs a flexible service-based architecture (SBA) in accordance with various aspects and embodiments of the disclosed subject matter.

The following detailed description is merely illustrative and is not intended to limit embodiments and/or application or uses of embodiments. Generally speaking, one or more embodiments can provide flexible service-based architecture (SBA) for communication networks.

Service-based architectures provide a modular framework from which common applications can be deployed using components of varying sources and suppliers. The Third Generation Partnership Project (3GPP) defines an SBA, whereby the control plane functionality and common data repositories of a 5G network are delivered by way of a set of interconnected Network Functions (NFs), each with authorization to access each other's services. Assuming the role of either service consumer or service producer, NFs are self-contained, independent and reusable. Each NF service exposes its functionality through a Service Based Interface (SBI), which employs a well-defined REST interface using hypertext transfer protocol 2.0 (HTTP/2).

The evolution of the wireless communication networks has resulted in the need for a new SBA that meet the demands of 5G networks and next generation networks while accommodating a variety of different types of network technologies (e.g., Long Term Evolution (LTE), Wi-Fi, 3GGP, 5G, satellite, etc., and any future access technologies), services, applications and communication devices. To facilitate this end, one or more embodiments of the disclosed subject matter provide propose a flexible SBA architecture with intelligent composition of network functions, features, and distribution based on the service/applications needs. The flexible SBA abstracts and views all the network technologies, their components, sub-components and features as individual network resources and arranges them in a hierarchical structure that can be picked and chosen on demand to support service delivery based on different service needs (e.g., latency requirements, quality of service requirements, service level agreements (SLAs), reliability requirements, etc.). The network resources are thus viewed and distributed like plug-in modules with universal interfaces into the service delivery system.

The level of abstraction of the network resources can be highly granular, breaking down different types of physical and logical resources into granular components and sub-components. For example, with respect to physical radio access network (RAN) resources such as the base stations (e.g., gNode Bs (gNBs), eNode Bs, (eNBs) etc.), in addition to identifying the base stations of the network and their respective locations and service cell coverage, the network resource abstraction information can further break down these resources into components and/or sub-components based on protocol stack layers, sub-layers and associated functions (e.g., layer 2 functions, layer 3 functions, etc.). For instance, the 5G and LTE control plane protocol stack comprises a radio link control (RRC) layer that performs layer 3 functions and a media access control (MAC) layer that performs layer 2 functions, one of which includes a hybrid automatic repeat request (HARQ) function. In some embodiments, some or all of these layers' individual functions, such as the HARQ function, can be viewed as separate resource sub-components that can be selectively and independently activated and deactivated on demand based on particular service needs. The same or a similar granular design can be used for physical and/or logical resources associated with other parts of the network such as the transport networks and the network core.

The service-based resource selection and orchestration can be performed by a centralized controller that is communicatively and operatively coupled to the network resources. In some embodiments, this controller can comprise a software defined network (SDN) controller that can be made available to network providers as a software-as-a-service (SAS). The controller can receive customer service orders for specific services (e.g., a voice service, a video service, a virtual private network (VPN) service, a VR service, etc.) to be provided to customer devices (e.g., user equipment (UE) devices) via the network. The service orders may be received as a token with customer account information and associated with a specified SLA for the service type and/or customer account. With knowledge of the network resource abstractions, the controller can further flexibly select the most appropriate (e.g., efficient, cost-effective, etc.) network resources for the service/customer account based on service requirements for service ordered (e.g., reliability requirements, latency requirements, etc.). In this regard, the controller provides a dynamic intelligent composition of functions and interfaces to create a service instance and/or network slice for the service ordered. The controller further creates and/or chains logical and physical ports on demand for the connectivity to the network.

Various aspects described herein can relate to New Radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

In some embodiments, the non-limiting term radio network node or simply network node, radio network device or simply network device and network equipment are used herein. These terms may be used interchangeably, and refer to any type of network node that can serve a UE and/or be connected to other network node or network element or any radio node from where user equipment receives signal. Examples of radio network nodes are Node B, base station (BS), multi-standard radio (MSR) node such as MSR BS, gNodeB, eNode B, access point (AP) devices, network controller, radio network controller (RNC), base station controller (BSC), relay, donor node controlling relay, base transceiver station (BTS), transmission points, transmission nodes, radio resource unit (RRU), remote radio head (RRH), nodes in distributed antenna system (DAS), etc.

In some embodiments, the non-limiting term communication device (or user equipment (UE), device or similar term) is used. It can refer to any type type of wired or wireless device that can communicate with a network node in a wired or wireless communication system and/or a radio network node in a cellular or mobile communication system. Examples of communication devices can include, but are not limited to, a computer (e.g., a desktop computer, a laptop computer, laptop embedded equipment (LEE), laptop mounted equipment (LME), or other type of computer), a mobile terminal, a cellular and/or smart phone, a tablet or pad (e.g., an electronic tablet or pad), an electronic notebook, an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a set-top box, an IP television (IPTV), a device to device (D2D) UE, a machine type UE or a UE capable of machine to machine (M2M) communication, a Personal Digital Assistant (PDA), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), a music or media player, speakers (e.g., powered speakers having wireless communication functionality), an appliance (e.g., a toaster, a coffee maker, a refrigerator, or an oven, or other type of appliance having wireless communication functionality), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs).

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

FIG. 1 illustrates an example communication system 100 that employs a flexible service-based architecture (SBA) in accordance with various aspects and embodiments of the disclosed subject matter. Communication system 100 comprises a distributed network architecture including a plurality of different network resources distributed between an access network layer 104, a transport layer 108, and a network core layer 108. These network resources can include physical resources 128 as well as logical resources 126. These three layers and associated resources are collectively referred to as a communication network 101 or simply network 101. The network 101 can be associated with a single network provider, multiple network providers, and/or encompass a variety of different type of wired and wireless communication technologies (e.g., 3GGP, WiFi, LTE, satellite, 5G, etc.) and sub-networks. Although the physical resources 128 and logical resources 126 are illustrated as separate resources in the network 101, it should be appreciated that in practice, many of the physical resources 128 may incorporate and logical resources 126, and vice versa. In addition, it should be appreciated that a few (e.g., 12 total) physical resources 128 and logical resources 126 are illustrated for brevity and that in practice, the number of physical and logical resources associated with the respective layers may include hundreds, thousands, millions, etc., or more of same and different types of resource respectively distributed in different physical locations and/or in the cloud (i.e., virtualized). Further, although not explicitly illustrated, it should be appreciated that the respective layers (e.g., the access layer 104, the transport layer 106 and the core layer 108), and/or the physical and logical resources associated with the respective layers are communicatively and/or operatively coupled to one another via one or more wired or wireless communication channels.

The access layer 104 controls connection and access of communication devices 102 (communication device 1 (CD1, CD2, etc.) to the network 101 via one or more physical network access points (APs). It should also be appreciated that two communication devices 102 are illustrated or brevity and that in practice, the number of communication devise 102 can include hundreds, thousands, millions, billions, etc., of devices. The access layer 104 usually incorporates Layer 2 switches and access points that provide connectivity between workstations and servers. The physical resources 128 associated with the access layer 104 can include the access point (AP) devices, system, and/or sub-networks that control physical connectivity of communication devices 102 to the network 101. The logical resources 126 associated with the access layer can include a variety of different software defined tools that control logical access to the network, such as tools for managing access control with respect to network policies and security (e.g., credentials, validation, authorization, etc.). These components can enforce access control measures for systems, applications, processes and information. For example, the logical resources 126 associated with the access layer can manage access control and policy, create separate collision domains, and implement port security.

The types of the physical APs can vary and can include a variety of different types of access points devices/systems that employ a variety of different types of wired and wireless communication access technologies (e.g., 3G, 4G, LTE, 5G, Wifi, satellite, etc.). Depending on the type of the APs, the APs may be standalone AP devices or part of separate communication networks (e.g., satellite communication networks, mobile communication networks, cellular communication networks, multi-carrier communication networks, etc.). In various embodiments, at least some of the physical resources 128 included in the access layer 104 can correspond to RRUs (also referred to as base stations) of a cellular communication network that employs a RAN architecture. The cellular communication network can correspond to a 5G network, an LTE network, a 3G network or another type of cellular technology communication network. The RAN can comprise various network components or devices, which can include one or more RANs, wherein each RAN can comprise or be associated with a set of base stations located in respective coverage areas served by the respective base stations. The respective base stations can be associated with one or more sectors (not shown), wherein respective sectors can comprise respective cells. The cells can have respective coverage areas that can form the coverage area covered by the one or more sectors. Communication devices 102 can be communicatively connected to the cellular communication network via respective wireless communication connections with one or more of the base stations.

In some embodiments, the one or more RANs can be based on open-RAN (O-RAN) technology and standards. These standards can define the open interface that can support interoperability of network elements (e.g., radio unit (RU), central unit (CU), distributed unit (DU), real or near real time RAN intelligent controller (RIC), or other types of network elements from different entities (e.g., vendors). The network elements may be virtualized, e.g., software-based components that can run on a common virtualization/cloud platform. In certain embodiments, the O-RAN based RAN can utilize a common platform that can reduce reliance on proprietary platforms of service providers. The O-RAN based RAN also can employ standardized interfaces and application programming interfaces (APIs) to facilitate open source implementation of the O-RAN based RAN.

In some embodiments, the one or more RANs can be a cloud-based radio access network (C-RAN). A C-RAN is a deployment paradigm that seeks to isolate baseband unit (BBU) from its remote radio unit (RRU) in base station (BS), consolidating the BBUs into a common place referred to as the BBU pool. In the BBU pool, the computing resources provided by the BBUs can be dynamically assigned to RRUs on demand by the BBU controller. Thus, with the fluctuation of data traffic from RRUs, a part of BBUs can be dynamically turned on or off.

The transport layer 106 serves as the communication point between the access layer 104 and the core 108. Its primary functions are to provide routing, filtering, and QoS management and to determine how packets can access the core. For example, the logical resources 126 associated with the transport layer 106 can determine and control the most efficient way that network service requests are accessed—for example, how a file request is forwarded to a server—and, if necessary, forwards the request to the core layer 108.

The physical resources 128 associated with the transport layer 106 usually consists of routers, routing systems, and multilayer switches.

The core layer 108, also referred to as the network backbone, is responsible for transporting large amounts of traffic quickly. The core layer provides interconnectivity between the transport layer devices. The physical and logical network resources associated with the core layer 104 can vary depending on the architecture of the network 101. Next generation cellular networks are implementing substantially software defined network core elements. The network core typically provides key Evolved Packet Core functions including the Mobile Management Entity (MME), the Serving Gateway (S-GW), the Packet Data Network Gateway (PDN-GW), the Home Subscriber Server (HSS), a Policy Control Rules Function (PCRF), an Access and Mobility Management Function (AMF), a User Plane Function (UPF), and others. The core layer 108 may include high speed devices, like high end routers and switches with redundant links.

Regardless, of the types and features/functionalities of the physical resources 128 and logical resources 126 associated with the respective access, transport and core layers of the network 101, system 100 abstracts and views all the network technologies, their components, sub-components and features as individual network resources and makes this information available in a network resource abstraction layer 110 as network resource abstraction information 114. The communication system 100 further includes a service design and orchestration layer 116 that is coupled to the network resource abstraction layer 110 that employs the network resource abstraction information 114 to flexibly select and distribute (e.g., via the controller component 118) the network resources on demand to support service delivery based on different service needs (e.g., latency requirements, quality of service requirements, service level agreements (SLAs), reliability requirements, etc.). System 100 thus views and distributes the network resources like plug-in modules with universal interfaces into the service delivery system.

Figure 2:
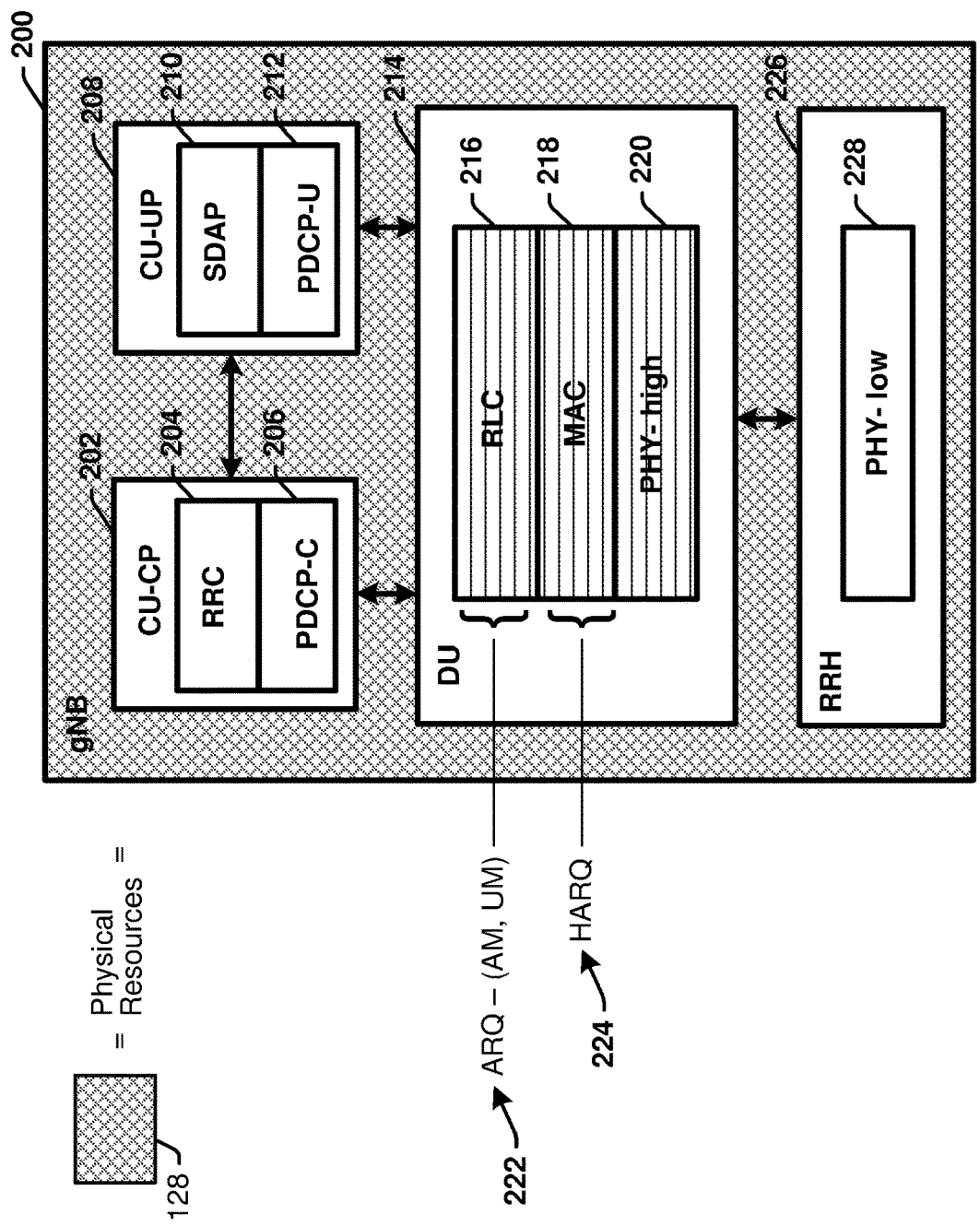
FIG. 2 presents an example gNode B (gNB) in accordance with various aspects and embodiments of the disclosed subject matter.

The level of abstraction of the network resources can be highly granular, breaking down different types of physical resources 126 and logical resources 128 into granular components and sub-components. For example, in some embodiments, system 100 can define the respective physical resources 128 and logical resources 126 as separate resource components, and further break down these components into sub-components arranged in a hierarchical structure. The sub-components may comprise different physical sub-components and/or logical sub-components. For example, in some embodiments, the sub-components can include different communication protocols, functions and/or features associated with the physical resources 128 and/or the logical resources 126. For example, with respect to physical RAN resources such as the base stations (e.g., eNBs, gNBs, etc.), in addition to defining separate base station devices as different physical resource components, system 100 can further break down these resources into sub-components based on protocol stack layers, sub-layers and associated functions (e.g., layer 2 functions, layer 3 functions, etc.), as illustrated in FIG. 2. The same or a similar granular design can be used for physical and/or logical resources associated with other parts of the network such as the transport networks and the network core.

In this regard, FIG. 2 presents an example gNB 200 in accordance with various aspects and embodiments of the disclosed subject matter. The gNB 200 can correspond to an example physical resource 128 in the access layer 104 of system 100 and be defined as a distinct physical resource component in accordance with the flexible SBA architecture of system 100.

The 5G NR network is composed of a NG RAN (Next Generation Radio Access Network) and 5GC (5G Core Network). The NG-RAN is composed of gNBs (i.e. 5G Base stations) and ng-eNBs (i.e. LTE base stations). Example gNB 200 corresponds to a 5G/NR base station in accordance with the 3GPP TS 38.300 specification. The gNB 200 is composed of a plurality of different nodes, each of which may be considered a separate sub-component of the gNB in accordance with the disclosed embodiments. As illustrated these sub-components can be arranged in a hierarchical structure, wherein some sub-components include further sub-components thereof, and further sub-components thereof, and so on.

In the embodiment shown, the sub-components include different units, communication protocol layers and different communication protocols associated with the different layers. The 5G protocol stack includes the physical layer (PHY layer, or layer 1, separated in the gNB as PHY-low 228 and PHY-high 220), the MAC layer 218, the RLC layer 216, the control plane packet data convergence protocol (PDCP layer) and the RRC layer 204. The protocol layers are mapped into four physical units, the Remote Radio Head (RRU 226), the Distributed Unit (DU 214), the Central Unit Control Plane (CU-CP 202) and the Central Unit User Plane (CU-UP 208). The CU-CP 202 includes the RRC layer 204 and the control plane packet data convergence protocol (PDCP-C) layer 206. The CU-UP 208 includes the service data adaptation protocol (SDAP) layer 210 and the user plane packet data convergence protocol (PDCP-U) layer 212. In some embodiments, each of these separate elements 202-228 and/or their functions may be viewed as separate resource components or sub-components that can be flexibly controlled (e.g., activated/deactivated) and disturbed based on service needs using the techniques described herein.

For instance, in accordance with the 5G and LTE control plane protocol stack, the RLC layer 216 and the MAC layer 218 perform several different functions. These different functions are represented by the different horizontal lines breaking up the respective layers as illustrated. In some embodiments, one or more of the different functions can also be defined as separate resource sub-components that may be selectively activated and deactivated based on service needs. For example, in one or more embodiments, these functions can include the HARQ function 224 performed by the MAC layer 218 and/or automatic repeat request (ARQ) function 222 performed by the RLC layer.

HARQ is a mechanism for reliable data transmission, used in the LTE and 5G MAC layer. In accordance with the HARQ mechanism, if the channel condition is good, the receiver (i.e., the communication device 102) successfully decodes the data and sends an acknowledgement (ACK) message to the transmitter (i.e., the gNB). If the channel condition is bad, the receiver cannot decode the data and it sends non-acknowledgement (NACK) message to the transmitter and continues to re-send the data (or partial data) until the receiver sends and AKC message notifying the transmitter it has successfully decodes the data. The number of re-transmissions is configurable (8 is common configuration). The ARQ function 222 performed by the RLC layer and supports both Acknowledge Mode (AM) and Un-acknowledge Mode (AM). AM requires re-transmission and UM does not. In this regard, in the AM, the transmitter sends a packet and waits for the ACK response until it sends another one, while in the UM, the transmitter doesn't wait and keeps sending packets. However, HARQ is always on for MAC layer data transmission in accordance with current 5G and LTE specifications.

The HARQ mechanism is suitable for transmission control protocol (TCP) type applications and ensures the necessary level of reliability for many types of applications requiring high reliability standards (e.g., banking applications, emergence applications, medical device applications, etc.). However, the multiple re-transmissions associated with the HARQ mechanism increases the latency. Accordingly, for certain applications/services that are more latency sensitive and can tolerate packet loss, such as video streaming applications, HARQ degrades the performance. For instance, with live video streaming applications, multiple retransmissions of a single video data packet are typically counterproductive after a few seconds have passed, as this significantly slows the progression of the video in time, and a preferred tradeoff would be to forgo a few missing data packets to maintain real-time or substantially real-time streaming. On the other hand, the HARQ mechanism may be lifesaving when applied to medical device control packets, where failure to ensure packet reception may result in the medical device not delivering a necessary medical treatment or service to a patient.

In accordance with one or more embodiments, the disclosed flexible SBA techniques decouples the HARQ function 224 for MAC layer data transmission by defining the HARQ mechanism as a configurable network resource sub-component that may be selectively activated and deactivated based on service needs (e.g., use HARQ for applications that requires reliability, disable HARQ for applications that are latency sensitive and can tolerate packet loss). Additionally, or alternatively, the HARQ function 224 may further be configurable with respect to the type of the HARQ mechanism applied. For example, the HARQ function 224 can be defined by different types based on the number of re-transmissions to be performed (e.g., type 1=1 re-transmission, type 2=2 re-transmissions, etc., up to 8 types/re-transmissions or more). In some embodiments, the ARQ function 222 and/or the AM and the UM may also be defined as configurable network resource sub-components that can also be selectively controlled (e.g., activated/deactivated) by the controller component 118 based on service needs.

With reference to FIGS. 1 and 2, similar to the granular break down of the gNB into different resource sub-components that may be selectively distributed (activated/deactivated) based on service needs, other physical resource 128 and logical resources 126 of the network can also be granularly broken down into different resource sub-components that may be selectively distributed (activated/deactivated) based on service needs. For example, with respect to security, a logical resource, the system can break down this logical resource into sub-components based on different security protocols that provide different level of security for different types of applications/services. In another example, the codec used for video and/or audio streaming (i.e., a logical resource) can be broken down into granular sub-components based on different compression rates, encoding and/or decoding protocols that can be selectively applied for different types of services based on need, customer SLA agreement criteria and the like.

With reference again to FIG. 1, the network resource abstraction information 114 can thus comprise information for all (or in some embodiments one or more) of the physical resources 128 and the logical resources 126 that identifies them, their respective locations (e.g., by physical locations, coverage areas and/or virtual resource location identifiers, such as universal resource locators (URLs), Internet Protocol (IP) addresses, etc.), and their respective sub-components (where applicable). For example, in some embodiments, the network resource abstraction information 114 can define each of the physical resources 126 and/or the logical resources 126 as resource components and include information that identifies and describes the respective components (e.g., location information, function information, feature information etc.). For each resource component comprising sub-components as described above, the network resource abstraction information 114 can further provide a granular level of abstraction of the respective sub-components associated therewith. This granular level of abstraction can provide information identifying and describing the respective sub-components (or component). For example, the information can describe the feature and/or functionalities of each sub-component. In some embodiments, the network resource abstraction information 114 can define the network resources and their sub-components in accordance with a hierarchical structure (e.g., a tree format or the like), that defines hierarchical relationships between the resource components and their sub-components.

With reference again to FIG. 1, in some embodiments, the network resource abstraction layer 110 can comprise a network resource abstraction component 112 that collects and generates the network resource abstraction information 114. With these embodiments, the network resource abstraction component 112 can regularly scan and screen the network (e.g., the access layer 104, the transport layer 106 and/or the core layer 108) to identify new network resources and/or updates to previously identified resources and update the network resource abstraction information 114 accordingly. Additionally, or alternatively, the network resource abstraction information 114 may be predefined. In some embodiments, the network resource abstraction component 112 can further collect condition information for relevant network resources (e.g., the physical resources 126) regarding current operating conditions associated therewith (e.g., load, channel quality, link quality, etc.) and associate this condition information with the respective resources in the network resource abstraction information 114. As described in greater detail infra with reference to FIG. 3, this condition information may also be used to selectively distribute the network resources for service provisioning based on demand.

The network resource abstraction layer 110 can also comprise or provide universal resource ports 124 for the respective resources included in the access layer 104, the transport layer 108 and the core layer 108. These universal resource ports 124 correspond to logical constructs that respectively identify their corresponding network resource and serve as connection points between the respective resources, the service design and orchestration controller (i.e., the controller component 118) provided at the service design and orchestration layer, and the service provider systems/devices (e.g., server, application servers, etc.) for the services ordered. In this regard, the universal resource ports 124 in the network resource abstraction layer 110 can correspond to logical communication interfaces to the respective resources. In the embodiment shown, each of the 12 illustrated resource components (e.g., each of the logical resources 126 and the physical resources 128) are designated a separate port of the universal resource ports. It should be appreciated however that many of these different resource components can comprise a plurality of sub-components. In accordance with the disclosed techniques, each granular resource, that is each of the sub-components associated with a resource component, can also be designated a separate port of the universal resource ports 124, thus facilitating a highly granular plug-and play service based resource model.

The service design and orchestration layer 116 can include a controller component 118 that performs the service design and orchestration functions of the system 100 using the network resource abstraction information 114 and service design and orchestration information 120 for the system 100. The service design and orchestration information 120 can include information regarding applicability of the different network resource components and their sub-component (as defined in the network resource abstraction information 114) to satisfy different service criteria associated with different types of services and/or service usage instances (e.g., which factor in additional contextual information related to the customer account, communication device type and capabilities, network conditions, etc.) provisioned by the system 100. In this regard, system 100 can facilitate provision of a wide range of different types of data communication services for different types of applications and communication devices. Some example data communication services can include but are not limited to: video streaming services, video call services, video content services, audio streaming services, audio call services, audio content services, electronic gaming services, text messaging services, multimedia messaging services, email services, website content delivery services, VR services, AR services, XR services, medical device/system services (e.g., medical information from wireless medical devices associated with users), emergency services, IoT device services and so on.

These different types of services can have different service requirements with respect to one or more defined service criteria regarding latency, reliability, quality of service (QOS), throughput, link quality, and others. The different network resource components and sub-components can provide different feature and functionalities that have different applicability with respect to satisfying the defined service criteria. For example, a first network resource sub-component may be inappropriate for satisfying a low reliability requirement (e.g., HARQ for video streaming services) yet appropriate for satisfying a high requirement (e.g., HARQ for banking application services). In addition, the service criteria (or criterion) required or preferred for a requested service can vary not only based on the type of service, but a defined SLA associated with the service and/or customer account associated with the requested service. Further, the service criteria (or criterion) required or preferred for a requested service can vary not only based on the type of service and/or associated SLA, but the specific type of communication device to which the service is to be provisioned and its capabilities, its location in the network 101, the specific type of network access technology available for connection of the communication device to the network 101, the location of the communication device, and current network conditions, among other factors.

To this end, the service design and orchestration information 120 can provide structured information that defines or indicates the optimal subset of the network resource components and/or sub-components to select for the provisioning a requested data communication service that accounts for the above noted factors. For example, in some embodiments, the service design and orchestration information 120 can include predefined rules that define different subsets of the system resource component and sub-components to use for different types of services. For example, the predefined rules can instruct the controller component 118 to use/enable the HARQ protocol for one or more first types of services (e.g., services requiring or preferring high reliability like online banking services, emergency services, and the like) and not use/disable the HARQ protocol for one or more second types of services (e.g., services where high reliability is not required or appropriate, such as video streaming services). Additionally, or alternatively, the service design and orchestration information 120 can include information that correlates appropriateness of each of the different network resource components and/or their sub-components for satisfying different service criteria requirements or preferences e.g., regarding latency, reliability, QoS, etc.) associated with a requested service under different operating contexts and/or for different types of communication devices. For example, the information may identify or indicate the relative appropriateness (e.g., in a ranked or hierarchical order) of the respective resource components and/or their sub-components for usage in delivering a specific service type and/or satisfying a one or more associated service criteria.

The controller component 118 can thus employ the network resource abstraction information 114 to identify all the different network resource components and sub-components available in the network and employ the service design and orchestration information 120 to determine and select a subset (e.g., including one or more) of the resource components and sub-components that best suited to use for provisioning a requested service based on the type of service, one or more service criteria required or preferred for the requested type of service, and optionally other factors related to the communication device type, location, network operating conditions, and so one.

In some embodiments, this controller component 118 can comprise or correspond to a software defined network (SDN) controller that can be made available to network providers as a software-as-a-service (SAS). In some embodiments, the controller component 108 can receive customer service orders (e.g., service order 122) for specific services (e.g., a voice service, a video service, a virtual private network (VPN) service, a VR service, etc.) to be provided to communication devices (e.g., communication devices 102 and the like) connected to the network 101 via the access layer 104. The service order 122 can include information identifying at least the requested service. In some embodiments, the service order 122 can also include information identifying or indicating one or more required or preferred service criteria for the provisioning of the service (e.g., required or preferred latency level, required or preferred link quality level, required or preferred reliability values, and so one). Such information may be extracted from an SLA associated with the requested service and/or a customer account associated with a customer identity associated with the service order. For example, in some embodiments, service orders (e.g., service order 122 and the like) may be received as a token with customer account information and associated with a specified SLA for the service type and/or customer account.

The controller component 118 can further access the network resource abstraction information 114 provided in the network resource abstraction layer 110 and employ this information along with the service design and orchestration information 120 to select a subset of the resource components and/or sub-components for provisioning of the service based on one or more service criteria defined for the service (e.g., predefined and/or associated with an SLA and/or customer account), the type of the communication device, and optionally other contextual factors related to communication device location and network conditions. In this regard, with knowledge of the network resource abstractions, the controller component 118 can flexibly select the most appropriate (e.g., efficient, cost-effective, etc.) network resources for the service/customer account based on service requirements for service ordered (e.g., reliability requirements, latency requirements, etc.). In this regard, the controller component 118 provides a dynamic intelligent composition of functions and interfaces to create a service instance and/or network slice for the service ordered. The controller component 118 further creates and/or chains the corresponding universal resource ports for the selected resources on demand for the connectivity to the network 101.

To this end, the service design and orchestration layer 116 (and/or the components thereof) and the network resource abstraction layer 110 (and/or the components thereof), can be communicatively coupled to one another and the respective layers of the network 101. In some embodiments, the service design and orchestration layer 116 and the network resource abstraction layer 110 (and/or the components thereof) may be combined. In conventional SBA architectures, the controller component 118 functions are located at the core 108 and tailored to a single service provider network. However, with the disclosed architecture, the controller component 118 and the corresponding network resource abstraction, design and distribution functions are removed from the core 108 and located external to the network 101. With this configuration, the controller component 118 and the corresponding network resource abstraction, design and distribution functions can be made available to multiple different network providers as a SAS and are configurable to flexibly control a variety of different network types and resources on demand. In addition, using the information made available to the controller component 118 in the network resource abstraction layer 110 identifying the universal resource ports 124 to corresponding network resources, the controller component 118 can instantiate provision of services to communication devices and chain the respective ports (e.g., of the universal resource ports 124) for selected resources for a given service together at the time of provision (i.e., chaining of the resource ports).

Figure 3:
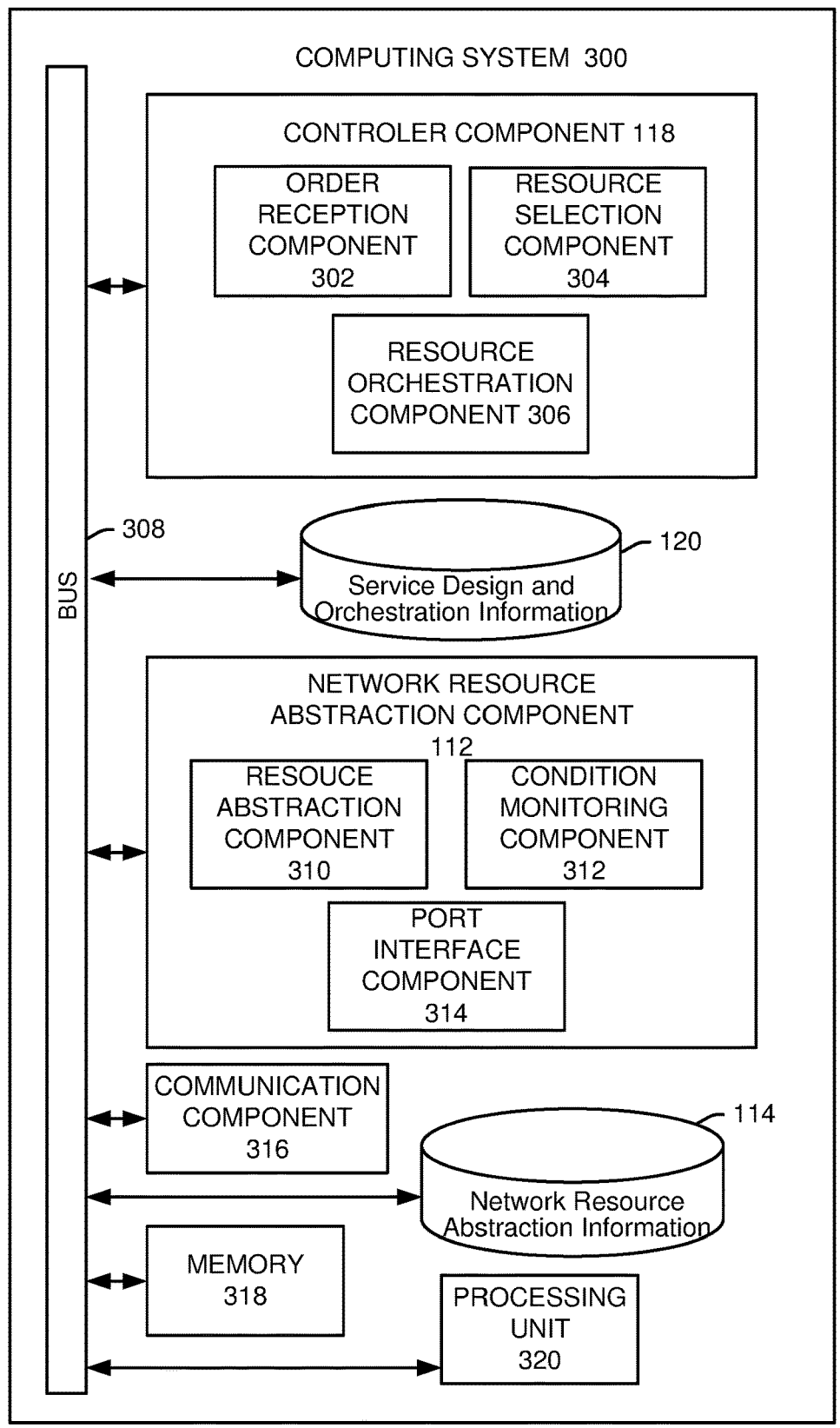
FIG. 3 illustrates a block diagram of an example computing system that facilitates a flexible SBA for communication networks in accordance with various aspects and embodiments of the disclosed subject matter.

FIG. 3 illustrates a block diagram of an example computing system 300 that facilitates a flexible SBA for communication networks in accordance with various aspects and embodiments of the disclosed subject matter. Computing system 300 corresponds to an example computing system that can execute the features and functionalities of the service design and orchestration layer 116 and the network resource abstraction layer 110. The computing system 300 may correspond to one or more physical computing systems (e.g., physical machines, devices, etc.), one or more virtual computing systems, or a combination thereof. Repetitive description of like elements employed in respective embodiments is omitted for sake of brevity.

Embodiments of systems and devices described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. For example, the computing system 300 can include various computer executable components, including controller component 118, order reception component 302, resource selection component 304, resource orchestration component 306, network resource abstraction component 112, resource abstraction component 310, condition monitoring component 312, port interface component 314 and communication component 316. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 318 of the computing system 300 which can be coupled to processing unit 320 for execution thereof. Examples of said and memory and processor as well as other suitable computer or computing-based elements, can be found with reference to FIG. 8, and can be used in connection with implementing one or more of the systems or components shown and described in connection with FIG. 1, FIG. 3, or other figures disclosed herein. The computing system 300 further includes the service design and orchestration information 120 and the network resource abstraction information 114. The computing system 300 can further include a system bus 308 that communicatively and operatively couples the respective components and elements of the computing system 300 to one another.

With reference to FIGS. 1 and 3, the communication component 316 can include or correspond to hardware and/or software that facilitates communication between the computing system 300 and other systems/devices of the network 101, including the respective physical resources 128, logical resources 126 and their granular sub-components.

The controller component 118 can perform the service design and orchestration functions of communication system 100 in accordance with various aspects and embodiments described herein. To facilitate this end, the controller component 118 can include order reception component 302, resource selection component 304, and resource orchestration component 306. The order reception component 302 can receive service requests (i.e., a service order 122) for provision of a data communication service to a communication device 102 via the communication network 101 comprising a plurality of different network resources (e.g., physical resources 128 and logical resources 126) defined by resource components and sub-components of the resource components. For example, the service request or service order may originate from a communication device 102 and traverse through the access layer 104, the transport layer 106 and/or the core layer 108 and be relayed/directed by one or more network nodes in the core layer 108 to the controller component 118. In some embodiments, the service request can be embodied in the form of a token that identifies or indicates the requested service and/or one or more service criteria required or preferred for the service. For example, the one or more service criteria can comprise a required or preferred latency level or latency range, a required or preferred reliability level or range, a required or preferred QoS level or range, a required or preferred link quality, a required or preferred security level, a required or preferred image/video data quality or format, a required or preferred audio data quality/format, and so on. In some implementations, the one or more service criteria may be extracted from a defined SLA for the type of the service and/or a customer account associated with a customer identity and the communication device 102. For example, one or more network nodes in the core layer 108 may identify and determine the one or more service criteria required or preferred for the type of service and/or customer account using internal subscriber information for the customer and the service provider accessible in the core layer 108 and include this information in the service order 122 provided to the controller component 118. Additionally, or alternatively, the controller component 118 may identify and determine the service criteria required or preferred for the type of service and/or customer account using internal subscriber information for the customer and the service provider defined in the service design and orchestration information 120.

In response to receiving the service request/order 122, the resource selection component 304 can select the most optimal subset of the network resources for provisioning the data communication service to the communication device 102 that satisfy the one or more service criteria associated with the service request using the network resource abstraction information 114 and the service design and orchestration information 120. The most optimal subset can include for example, one or more specific physical resource components and/or sub-components, and/or one or more specific logical resource components and/or sub-components that satisfy the one or more service criteria. The most optimal subset can also include predefined network resource components and/or sub-components determined to be applicable or inapplicable to different types of services/application, communication devices, and/or customer accounts. To facilitate this end, the resource selection component 304 can access the network resource abstraction information 114 for the network 101 that identifies the different resource components and their sub-components and provides information describing the features and functionalities of the respective components and sub-components. The network resource abstraction information 114 can further provide routing information for the respective resource components and sub-components that identifies how to access and establish communications and connection paths to the respective components and sub-components (e.g., physical location information, URL information, IP address information etc.). The resource selection component 304 can use the network resource abstraction information to identify all the potentially available network resources that may be applicable to satisfy the service criteria required or preferred for the service request. The resource selection component 304 can further access and employ the service design and orchestration information 120 to facilitate selecting the optimal subset of network resources for provisioning the data communication service to the communication device. As noted above, the service design and orchestration information 120 can include additional information the correlates different types of data communication services and/or service criteria with appropriate and inappropriate network resource components and/or sub-components for usage in provisioning the different types of data communication services.

For example, in one or more embodiments, the service design and orchestration information 120 can indicate whether and what type of HARQ mechanism should be activated or deactivated for different types of data communication services and/or is applicable for satisfying different service criterion. In accordance with this example, if the service order 122 indicates a reliability level below a threshold reliability level (e.g., based on the type of service and/or defined service criterion associated with the service order), the resource selection component 304 can select deactivation of the HARQ mechanism by the MAC layer of the specific gNB via which the communication device is connected to the network. Similarly, if the service order 122 indicates a defined reliability level correlated to specific type of HARQ mechanism (e.g., a type 3 HARQ that limits the re-transmissions to 3), the resource selection component 304 can select activation of the specific type of HARQ mechanism by the. In another example, if the service order 122 indicates a reliability level above a threshold reliability level, the resource selection component 304 can select activation of the HARQ mechanism.

After the resource selection component 304 has selected the optimal subset of network resource components and/or sub-components for provisioning a request service in response to reception of a service order 122, the resource orchestration component 306 can facilitate the provision of the data communication service to the communication device 102 via the communication network 101 using the selected subset. In some embodiments, the resource orchestration component 306 can communicate service-based resource assignment information to the respective resource components and/or sub-components included in the subset that instructs the respective resources to be used or not used for the specific service order. In this regard, in furtherance to the above HARQ embodiment, the resource orchestration component can control enablement and disablement of the HARQ protocol or protocol type for the provision of the data communication service by the corresponding gNB based on the selecting the usage or the non-usage of the HARQ protocol or the type of the HARQ protocol. In some embodiments, the resource orchestration component 306 can create and/or chain the logical ports (e.g., of the universal resource ports 124) for the respective resources included in the subset for connectivity to the network 101. The port interface component 314 can further provide the corresponding interfaces between the created/chained logical ports and the corresponding resources in the network 101.

In some embodiments, the resource abstraction component 310 can collect and generates the network resource abstraction information 114 for the network 101. With these embodiments, the resource abstraction component 310 can regularly scan and screen the network (e.g., the access layer 104, the transport layer 106 and/or the core layer 108) to identify new network resources and/or updates to previously identified resources and update the network resource abstraction information 114 accordingly. Additionally, or alternatively, the network resource abstraction information 114 may be predefined.

In some embodiments, the condition monitoring component 312 can further collect condition information for relevant network resources (e.g., the physical resources 126) regarding current operating conditions associated therewith (e.g., load, channel quality, link quality, etc.) and associate this condition information with the respective resources in the network resource abstraction information 114. The resource selection component 304 may also use this condition information to select the most appropriate subset of network resources for provisioning a data communication service of a received service order based on current network conditions.

Figure 4:
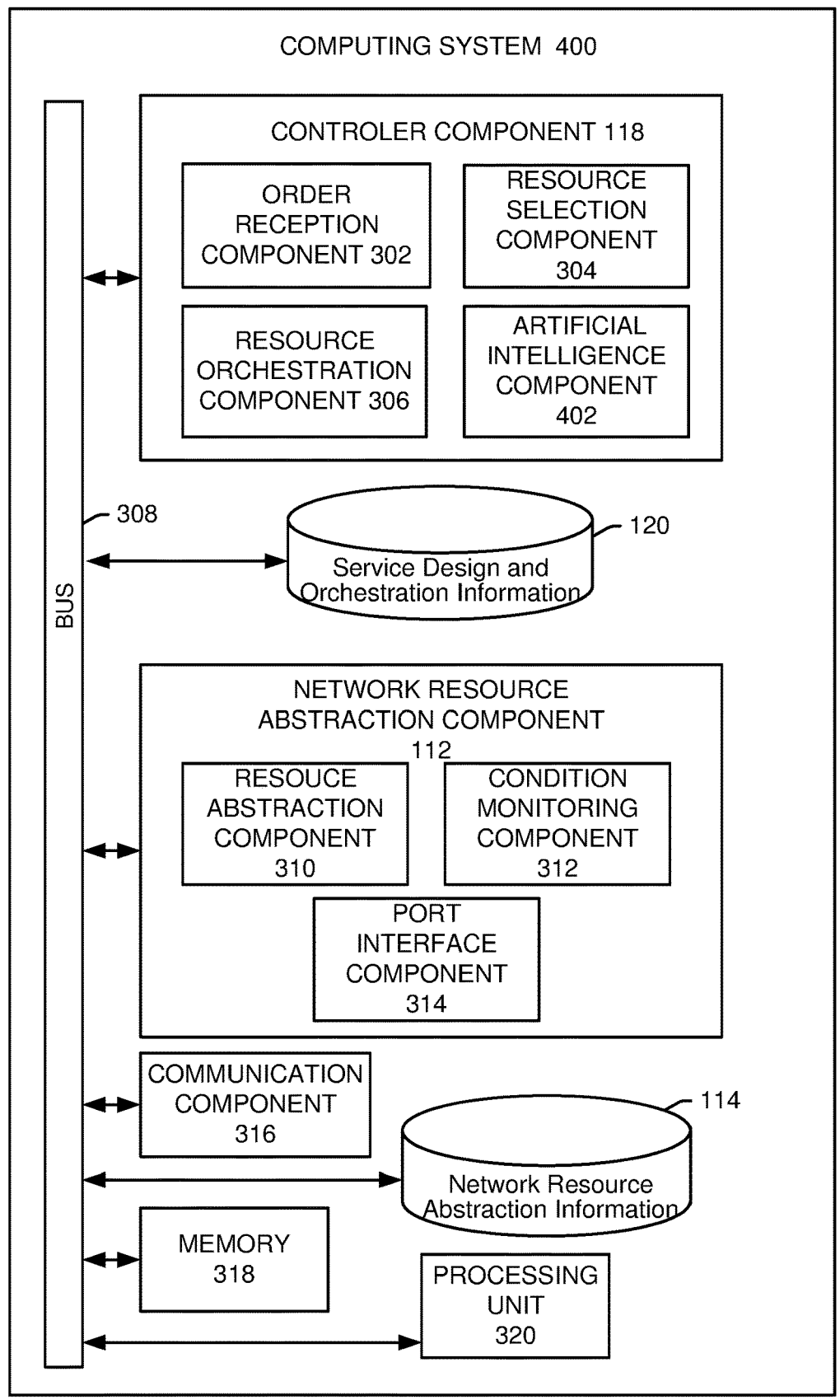
FIG. 4 illustrates a block diagram of another example computing system that facilitates a flexible SBA for communication networks in accordance with various aspects and embodiments of the disclosed subject matter.

FIG. 4 illustrates a block diagram of another example computing system 400 that facilitates a flexible SBA for communication networks in accordance with various aspects and embodiments of the disclosed subject matter. Computing system 400 comprises same or similar components as computing system 300 with the addition of artificial intelligence (AI) component 402 to the controller component 118. Repetitive description of like elements employed in respective embodiments is omitted for sake of brevity.

In some embodiments, controller component 118 can comprise or be associated with an AI component 402 to facilitate determining the optimal subset of network resource to select for provisioning a data communication service to a communication device in association with reception of a service order 122 therefore. In accordance with these embodiments, the AI component 402 can perform an AI and/or machine learning (ML) analysis on the network resource abstraction information 114 and the service design and orchestration information 120 to determine or infer the most optimal subset of network resources to use for a given type of data communication service that satisfies required or preferred service criterion of the type of service (e.g., and/or as defined in an associated SLA for the service/customer account) and further achieves optimal network efficiency while balancing the needs of all customers. With these embodiments, the AI component 402 can also analyze data comprising or relating to users associated with the communication devices (e.g., user preferences of users associated with communication devices or communication networks), data traffic associated with data sessions involving the service orders, communication conditions associated with network resources, applications, services, communication device location data, metadata, historical information relating thereto, network policy information, or other desired types of information.

In some embodiments, in connection with or as part of such an AI or ML analysis, the AI component 402 can employ, build (e.g., construct or create), and/or import, AI and/or ML techniques and algorithms, AI and/or ML models, neural networks (e.g., neural networks trained using the AI component 402), and/or graph mining to render and/or generate predictions, inferences, calculations, prognostications, estimates, derivations, forecasts, detections, and/or computations that can facilitate selecting the optimal subset of network resources.

The AI component 402 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 402 can examine the entirety or a subset of the data (e.g., the service design and orchestration information 120, the network resource abstraction information 114, network and communication device conditions data, data associated with data sessions, UEs, network policy information, SLA information, and other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 5:
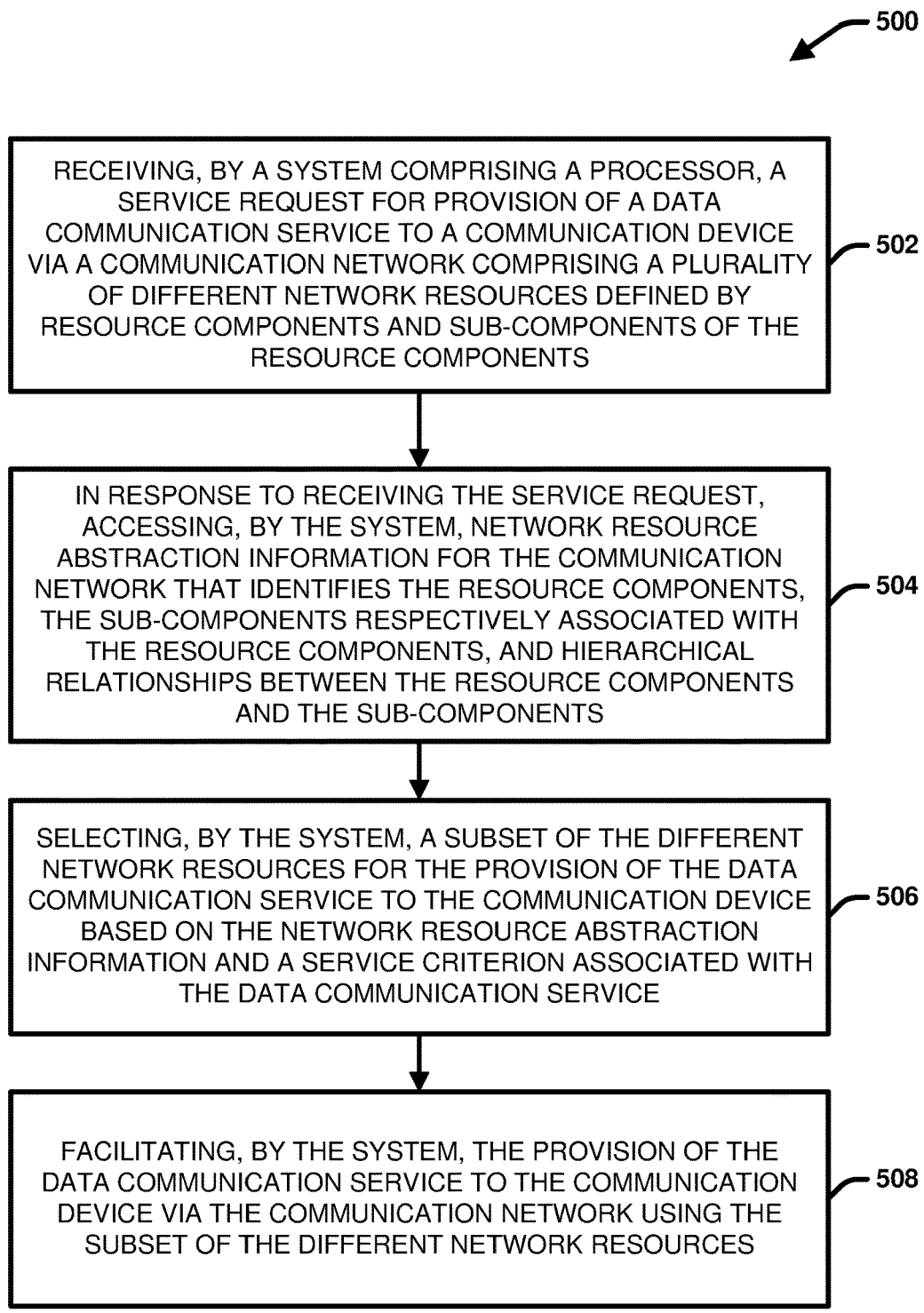
FIG. 5 illustrates a flow chart of an example method that facilitates flexible, service-based network resource design and orchestration, in accordance with various aspects and embodiments of the disclosed subject matter.
Figure 6:
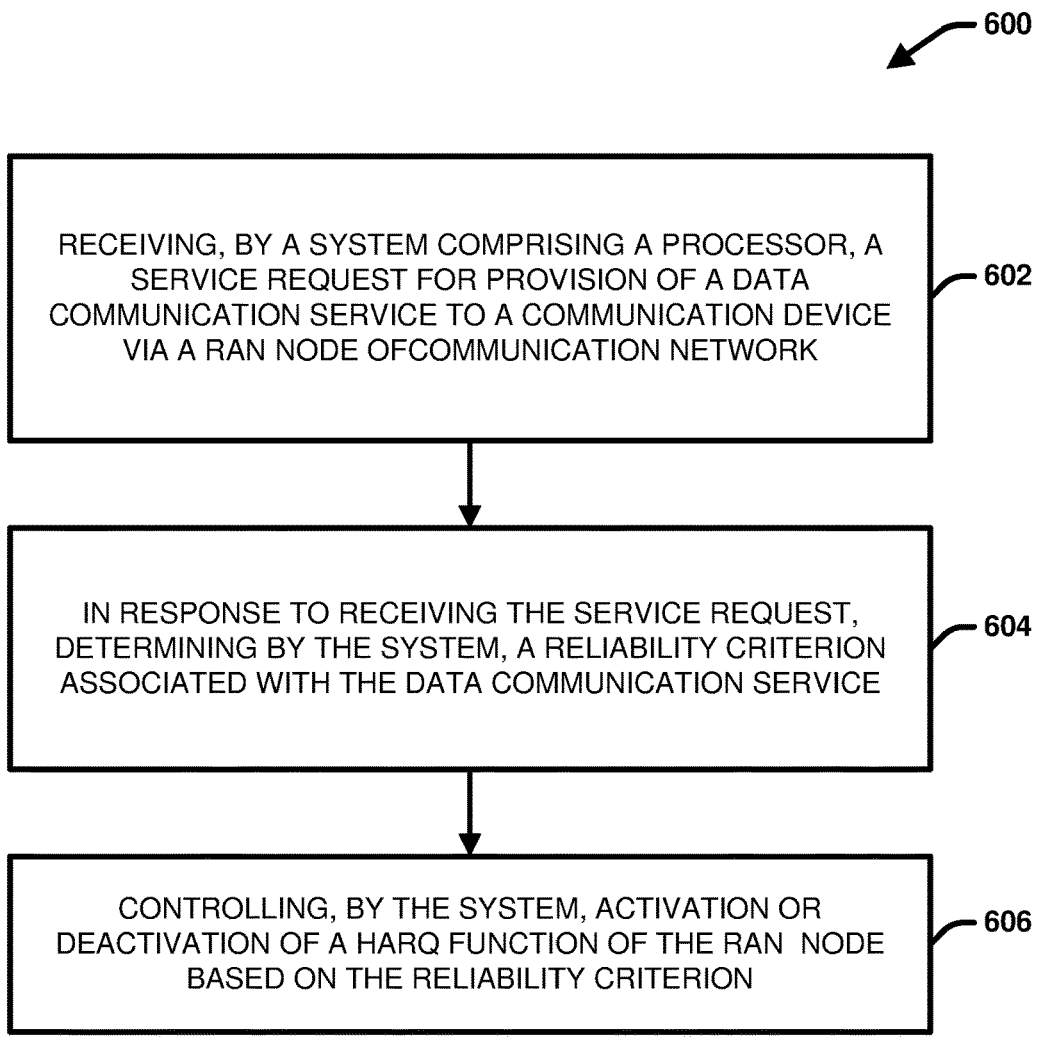
FIG. 6 illustrates a flow chart of another example method that facilitates flexible, service-based network resource design and orchestration, in accordance with various aspects and embodiments of the disclosed subject matter.

In view of the example systems and/or devices described herein, example methods that can be implemented in accordance with the disclosed subject matter can be further appreciated with reference to flowcharts in FIGS. 5-6. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 5 illustrates a flow chart of an example method 500 that facilitates flexible, service-based network resource design and orchestration, in accordance with various aspects and embodiments of the disclosed subject matter. At 502, method 500 comprises receiving (e.g., via order reception component 302), by a system comprising a processor (system 100, system 300, system 400 or the like), a service request (e.g., service order 122) for provision of a data communication service to a communication device (e.g., communication device 102) via a communication network (e.g., network 101) comprising a plurality of different network resources defined by resource components and sub-components of the resource components (e.g., physical resources 126 and sub-components thereof, and logical resources and sub-components thereof). At 504, method 500 comprises, in response to receiving the service request, accessing, by the system (e.g., via resource selection component 304), network resource abstraction information (e.g., network resource abstraction information 114) for the communication network that identifies the resource components, the sub-components respectively associated with the resource components, and hierarchical relationships between the resource components and the sub-components. At 506, method 500 comprises selecting, by the system (e.g., using resource selection component 304 and service design and orchestration information 120), a subset of the different network resources for the provision of the data communication service to the communication device based on the network resource abstraction information and a service criterion associated with the data communication service. At 508, method 500 comprises facilitating, by the system (e.g., via resource orchestration component 306), the provision of the data communication service to the communication device via the communication network using the subset of the different network resources.

FIG. 6 illustrates a flow chart of another example method 600 that facilitates flexible, service-based network resource design and orchestration, in accordance with various aspects and embodiments of the disclosed subject matter. At 602, method 600 comprises receiving (e.g., via order reception component 302), by a system comprising a processor (system 100, system 300, system 400 or the like), a service request (e.g., service order 122) for provision of a data communication service to a communication device (e.g., communication device 102) via a communication network (e.g., network 101) via a RAN node (e.g., a gNB) of the communication network. At 604 method 600 comprises, in response to receiving the service request, determining, by the system, a reliability criterion associated with the data communication service (e.g., via resource selection component 304). For example, the reliability criterion may be received with the request, determined (e.g., using the service design and orchestration information 120) based on the service type and/or an SLA associated with user account associated with the request, and/or determined by the AI component 402. At 606, method 600 comprises controlling, by the system, activation or deactivation of a HARQ function of the RAN node based on the reliability criterion (e.g., via the resource orchestration component 306).

Figure 7:
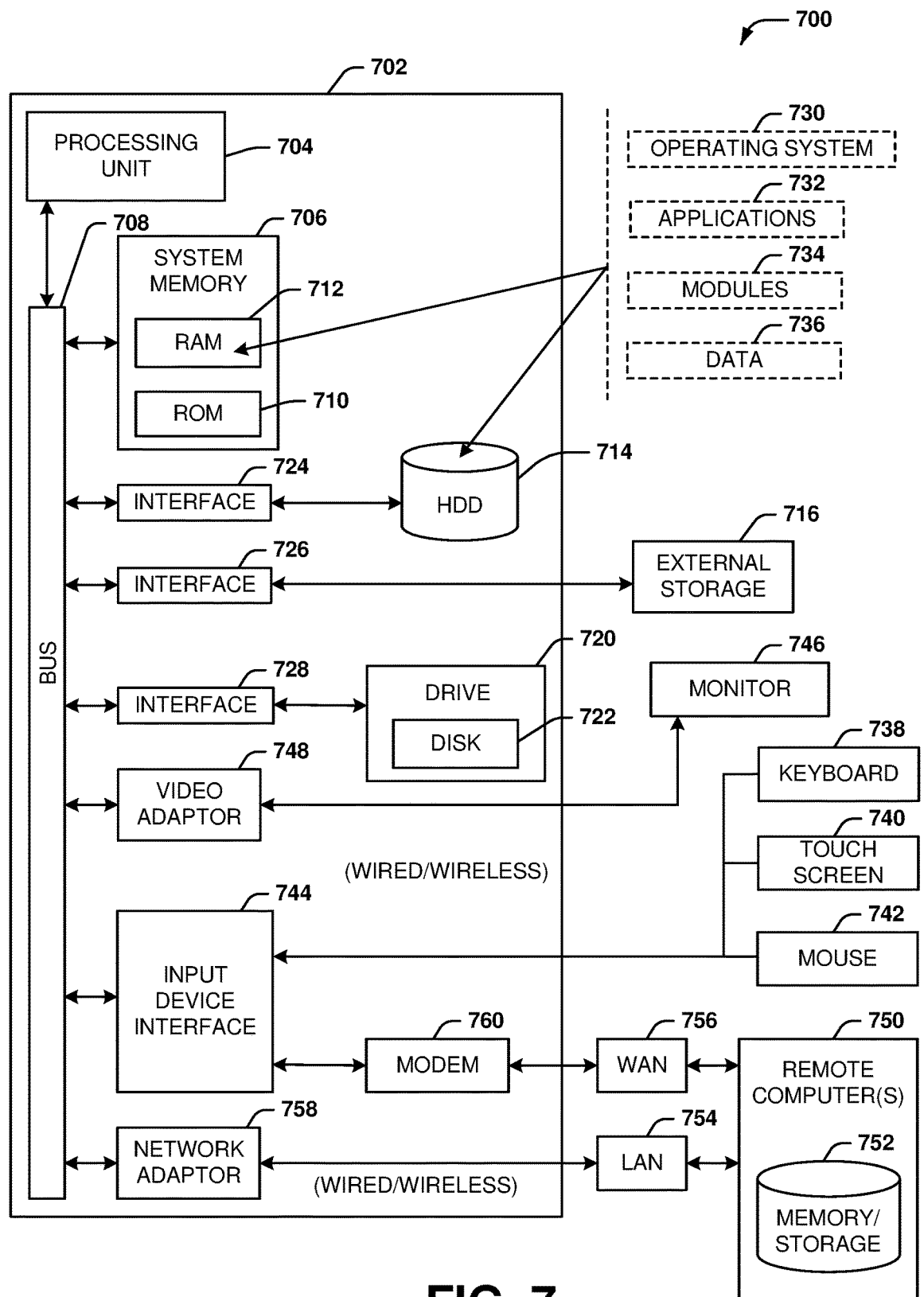
FIG. 7 is a schematic block diagram illustrating a suitable computing environment in which the various embodiments of the embodiments described herein can be implemented.

In order to provide additional context for various embodiments described herein, FIG. 7 and the following discussion are intended to provide a brief, general description of a suitable computing environment 700 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and a drive 720, e.g., such as a solid state drive, an optical disk drive, which can read or write from a disk 722, such as a CD-ROM disc, a DVD, a BD, etc. Alternatively, where a solid state drive is involved, disk 722 would not be included, unless separate. While the internal HDD 714 is illustrated as located within the computer 702, the internal HDD 714 can also be configured for external use in a suitable chassis (not shown). Additionally, while not shown in environment 700, a solid state drive (SSD) could be used in addition to, or in place of, an HDD 714. The HDD 714, external storage device(s) 716 and drive 720 can be connected to the system bus 708 by an HDD interface 724, an external storage interface 726 and a drive interface 728, respectively. The interface 724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can be enable with a security module, such as a trusted processing module (TPM). For instance with a TPM, boot components hash next in time boot components, and wait for a match of results to secured values, before loading a next boot component. This process can take place at any layer in the code execution stack of computer 702, e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1394 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the Internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the Internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above, such as but not limited to a network virtual machine providing one or more aspects of storage or processing of information. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

What is claimed is:

1. A system, comprising:
    a processor; and
    a memory that stores executable instructions that, when executed by the processor, facilitate performance of operations, comprising:
       receiving a service request for provision of a data communication service to a communication device via a radio access network node of a communication network, the data communication service corresponding to one of a live video streaming application or a transmission of medical device control packets;
       in response to receiving the service request, determining a reliability criterion associated with the data communication service; and
       controlling an activation or a deactivation of a hybrid automatic repeat request function of the radio access network node based on the reliability criterion, wherein when the data communication service corresponds to the live video streaming application the controlling includes the deactivation of the hybrid automatic repeat request function, and wherein when the data communication service corresponds to the transmission of medical device control packets the controlling includes the activation of the hybrid automatic repeat request function.

2. The system of claim 1, wherein the operations further comprise:
    in response to the receiving of the service request, selecting a subset of network resources of the communication network.

3. The system of claim 2, wherein the operations further comprise:
    facilitating, using the subset of network resources, the provision of the data communication service to the communication device.

4. The system of claim 2, wherein the subset of network resources includes physical resources.

5. The system of claim 2, wherein the subset of network resources includes logical resources.

6. The system of claim 2, wherein the selecting of the subset of network resources is based on accessing information for the communication network that identifies resource components, sub-components respectively associated with the resource components, and hierarchical relationships between the resource components and the sub-components.

7. The system of claim 6, wherein the information for the communication network is based operating conditions that include a load and a link quality.

8. The system of claim 1, wherein the reliability criterion is received with the service request.

9. The system of claim 1, wherein the determining of the reliability criterion is based on a service level agreement associated with a user account, and wherein the user account is associated with the service request.

10. The system of claim 1, wherein the determining of the reliability criterion is based on a use of artificial intelligence, machine learning, or a combination thereof.

11. The system of claim 1, wherein the controlling comprises the activation.

12. The system of claim 1, wherein the controlling comprises the deactivation.

13. A method comprising:
    receiving, by a system including a processor, a service request for provision of a communication service to a communication device via a radio access network node of a communication network, the communication service corresponding to one of a live video streaming application or a transmission of medical device control packets;
    in response to receiving the service request, determining, by the system, a reliability criterion associated with the communication service; and
    controlling, by the system, an activation or a deactivation of a hybrid automatic repeat request function of the radio access network node based on the reliability criterion, wherein when the communication service corresponds to the live video streaming application the controlling includes the deactivation of the hybrid automatic repeat request function, and wherein when the communication service corresponds to the transmission of medical device control packets the controlling includes the activation of the hybrid automatic repeat request function.

14. The method of claim 13, further comprising:
    in response to the receiving of the service request, selecting, by the system, a subset of network resources of the communication network.

15. The method of claim 14, further comprising:
    facilitating, by the system, the provision of the communication service to the communication device based on the selecting of the subset of network resources.

16. The method of claim 14, wherein the subset of network resources includes physical resources.

17. The method of claim 14, wherein the subset of network resources includes logical resources.

18. The method of claim 14, wherein the selecting of the subset of network resources is based on accessing information for the communication network that identifies resource components, sub-components respectively associated with the resource components, and hierarchical relationships between the resource components and the sub-components.

19. A non-transitory machine-readable medium, comprising executable instructions that, when executed by a processor, facilitate performance of operations, comprising:
determining a reliability criterion associated with a data communication service using machine learning and artificial intelligence, the data communication service corresponding to one of a live video streaming application or a transmission of medical device control packets; and
provisioning the data communication service to a first communication device based on controlling an activation or a deactivation of a hybrid automatic repeat request function of a radio access network node in respect of the first communication device, the provisioning of the data communication service to the first communication device being in accordance with the reliability criterion and in accordance with a utilization of first network resources included in a plurality of network resources, wherein when the data communication service corresponds to the live video streaming application the controlling includes the deactivation of the hybrid automatic repeat request function, and wherein when the data communication service corresponds to the transmission of medical device control packets the controlling includes the activation of the hybrid automatic repeat request function.

20. The non-transitory machine-readable medium of claim 19, wherein the operations further comprise:
provisioning the data communication service to a second communication device based on controlling the activation or the deactivation of the hybrid automatic repeat request function of the radio access network node in respect of the second communication device, the provisioning of the data communication service to the second communication device being in accordance with the reliability criterion and in accordance with a utilization of second network resources included in the plurality of network resources, the second network resources being different from the first network resources.

* * * * *